United States Patent [19]
Sasaki et al.

[11] Patent Number: 5,821,507
[45] Date of Patent: Oct. 13, 1998

[54] ELECTRIC COOKER USING INDUCTION HEATER

[75] Inventors: Koki Sasaki, Shiga; Kuniaki Iguchi, Kyoto, both of Japan

[73] Assignee: Hidec Co., Ltd., Kyoto, Japan

[21] Appl. No.: 833,780

[22] Filed: Apr. 9, 1997

[30] Foreign Application Priority Data

| | | | |
|---|---|---|---|
| Apr. 24, 1996 | [JP] | Japan | 8-102906 |
| Sep. 5, 1996 | [JP] | Japan | 8-235115 |
| Feb. 21, 1997 | [JP] | Japan | 9-037765 |

[51] Int. Cl.$^6$ .................... H05B 6/12; H05B 6/40
[52] U.S. Cl. .................. 219/622; 219/623; 219/624; 219/674; 219/671
[58] Field of Search .................. 219/624, 623, 219/622, 620, 621, 618, 634, 674, 672, 675, 662, 671, 656

[56] References Cited

U.S. PATENT DOCUMENTS

| | | | |
|---|---|---|---|
| 1,975,437 | 10/1934 | Sorrel | 219/618 |
| 1,997,741 | 4/1935 | Northrup | 219/618 |
| 2,352,332 | 6/1944 | Limpel | 219/674 |
| 3,108,169 | 10/1963 | Keller | 219/674 |
| 4,503,305 | 3/1985 | Virgin | 219/634 |
| 4,910,372 | 3/1990 | Vukich | 219/622 |
| 5,053,593 | 10/1991 | Iguchi | 219/624 |

FOREIGN PATENT DOCUMENTS

| | | |
|---|---|---|
| 0 287 219 | 10/1988 | European Pat. Off. . |
| 2 726 149 | 4/1996 | France . |
| 64-2285 | 1/1989 | Japan . |
| 5-217665 | 8/1993 | Japan . |
| 6-283263 | 10/1994 | Japan . |
| 8-106978 | 4/1996 | Japan . |

*Primary Examiner*—Philip H. Leung
*Attorney, Agent, or Firm*—Merchant, Gould Smith, Edell Welter & Schmidt

[57] ABSTRACT

An electric cooker is provided, which can grill foods by heat rays from a metal heating member using induction heating and is hardly affected by drops from the foods. This electric cooker comprises a work coil wound in a substantially pipe-like shape for generating an alternating magnetic flux, a metal heating member having a substantially pipe-like shape disposed inside and coaxially with the work coil for being heated by the alternating magnetic flux generated by the work coil so as to generate heat rays, and an insulator having a substantially pipe-like shape disposed between the work coil and the metal heating member. A wire mesh for supporting the foods is disposed adjacent to the upper opening of the insulator. A receiving pan is disposed adjacent to the lower opening of the insulator for receiving drops from the foods. The metal heating member preferably has a shape suitable for collecting the heat rays to the upper opening. The cooker also can be applied for heating a metal pot or pan by means of a second work coil and an induction coil.

22 Claims, 14 Drawing Sheets

ELECTRIC COOKER USING INDUCTION HEATER

BACKGROUND OF THE INVENTION

The present invention relates to an electric cooker using an induction heater, and more specifically, to an electric cooker that can grill meat, fish, vegetable and other foods by heat rays radiated from a metal heating member heated by induction heating.

Recently, induction heating (I.H.), i.e., heating a metal by eddy current loss generated in the metal by electromagnetic induction, is widely used in an induction heater that heats a pan, a rice cooker, or other applications. Previously, Hidec Co., Ltd. has developed an electric cooker that can simulate a charcoal burner and grill meat, fish, vegetable and other foods using an induction heater.

As shown in FIG. 14, the above mentioned electric cooker comprises an insulator 5 with a spacer leg 4 placed on a top plate 2 of the induction heater 1, and a metal heating member (plate) 6 placed on the insulator 5, an antenna coil 8 wound around the wall portion 5a of the insulator 5, and a cooling fan 7 with a motor 11. This motor 11 is driven by a direct current that is obtained by rectifying and smoothing an induced current in the antenna coil.

When a work coil 3 generates alternating magnetic flux, an eddy current is generated in the metal heating plate 6, which is heated by an eddy current loss to a surface temperature of 800 degrees Celsius. This heating plate 6 radiates heat rays (near, middle and far infrared rays), which grill a food placed above the metal heating plate 6. For example, the food is placed on a wire mesh that is set on the insulator 5.

In the above mentioned structure, cooling air from the fan 7 flows between the insulator 5 and the top plate 2 so that thermal insulation between the metal heating plate 6 and the top plate is enhanced. Therefore, the heating plate 6 is heated up to the enough temperature sufficient for radiating heat rays while the temperature increase of the induction heater is suppressed. Thus, this electric cooker can grill foods with heat rays in safety.

The above mentioned electric cooker is superior to a charcoal burner not only in its easiness of handling or cleanness but also in efficiency and durability. The charcoal requires removal of ashes from its surface for enough radiation of heat rays using a fan since the ashes covering the surface of the charcoal prevent it from radiating the heat rays. On the contrary, the surface of the metal heating plate heated by induction heating undergoes little oxidation, so that the metal heating plate can radiate heat rays efficiently over ten hours.

However, it is inevitable that an efficiency of the heat radiation decreases if the drops from the heated food, such as broth or a meat fragment contact with and smear the surface of the metal heating plate. These drops also may cause smoke and/or flame.

A main purpose of the present invention is to provide an improved electric cooker that can grill foods by heat rays and is hardly affected by drops from the foods.

Another purpose of the present invention is to provide the electric cooker with means for heating a metal pan or pot by induction heating easily by changing some members.

SUMMARY OF THE INVENTION

A first configuration of the electric cooker according to the present invention comprises a work coil wound in a substantially pipe-like (helical) shape for generating an alternating magnetic flux, a metal heating member having a substantially pipe-like shape disposed inside and coaxially with the work coil for being heated by the alternating magnetic flux generated by the work coil so as to generate heat rays, and an insulator having a substantially pipe-like shape disposed between the work coil and the metal heating member.

In this specification, "substantially pipe-like shape" includes a cylindrical shape, a polygonal pipe-like shape (pipe with a polygonal section), and a tapered pipe-like shape such as a frustoconical or frustopyramidal shape. It is preferable that the electric cooker further comprises means for supporting foods to be grilled, such as a wire mesh disposed adjacently to an upper opening of the insulator, and a pan for receiving drops from the foods, disposed adjacent to the lower opening of the insulator.

According to the above mentioned configuration, most drops from the foods drop to the receiving pan, passing through the inner space of the pipe-like metal heating member. Therefore, the above mentioned problems caused by the drops from the foods hardly happen in the configuration according to the present invention. In addition, the work coil in the present invention is wound helically instead of as a plane coil in the prior art, and the pipe-like metal heating member is disposed inside the work coil and the pipe-like insulator. Therefore, the coupling between the work coil and the metal heating member is closer in the present invention than in the prior art. This means that the efficiency of induction heating is higher in the present invention than in the prior art. The efficiency is further improved by placing a magnetic member having a substantially pipe-like shape around the work coil because leakage flux is reduced. This magnetic member also decreases an undesired radiation having high frequency.

It is also preferable to provide means for cooling an outer space of the insulator so as to cool the work coil and other members. For example, one or more cooling fans may be disposed around the work coil and the magnetic member to send cooling air to the work coil and the magnetic member.

The metal heating member is preferably made of a stainless steel plate having a thickness of 0.2–2.0 mm. Stainless steel has a high efficiency of induction heating and a good resistance to corrosion at a high temperature. The thickness of the steel plate hardly affects the heat efficiency since eddy currents are concentrated at the surface of the plate when driving the work coil with a high frequency inverter circuit. Therefore, it is more preferable that the thickness of the metal heating plate is 0.5 to 1.0 mm considering its mechanical strength.

As mentioned before, the shape of the metal heating member can be a cylindrical, polygonal pipe-like, or tapered pipe-like shape. A tapered pipe-like shape, which has a larger space area at the upper opening than at the lower opening, is preferable for collecting heating rays from the metal heating member to the upper opening where the foods to be heated are placed. Alternatively, the metal heating member may comprise a plurality of short pipe-like submembers and each submember has a larger space area at the upper opening than at the lower opening, arranged vertically and coaxially at a predetermined pitch. In this case, all submembers may have identical size, or an upper submember may have a larger diameter than a lower submember.

The insulator and the metal heating member are not required to be the same tapered shape. For example, the insulator may have a cylindrical shape while the metal heating member has a tapered pipe-like shape.

The work coil is preferably made of an aluminum wire. An aluminum wire has a higher resistance to corrosion at a high temperature than a copper wire, so that the heat resistance of the work coil is improved by using an aluminum wire. As a result, an inexpensive material can be used for the insulator, or a cooling mechanism for the work coil can be simplified. The aluminum wire is preferably coated with an oxide film and more preferably coated with a glass so as to improve its insulation properties.

A second configuration of the electric cooker according to the present invention comprises a first work coil wound in a substantially pipe-like (helical) shape for generating an alternating magnetic flux, an induction coil wound in a substantially pipe-like shape disposed inside and coaxially with the first work coil, an insulator having a substantially pipe-like shape disposed between the first work coil and the induction coil, a second work coil wound in a plane shape disposed adjacent to an upper opening of the insulator, the second work coil connected to the both ends of the induction coil, and a top plate disposed above the second work coil.

According to the above mentioned configuration, an alternating current power supplied to the first work coil is transmitted to the induction coil, since the first work coil corresponds to a primary coil and the induction coil corresponds to a secondary coil of a transformer. Then the alternating current power is supplied to the second work coil that is connected to the induction coil so that the second work coil generates an alternating magnetic flux. This alternating magnetic flux generates eddy currents in a metal pan for example, placed on the top plate. As a result, the metal pan is heated by an eddy current loss. The top plate is made of a material that has good properties of insulation, resistance to corrosion and mechanical strength, such as a ceramic.

The electric cooker having the above mentioned configuration preferably includes a high frequency inverter circuit. For example, if the first work coil is driven by an inverter circuit with a high frequency of approximately 30 kHz, the transmission efficiency from the first work coil to the second work coil via the induction coil is higher than that when driving with a low frequency.

It is preferable that the first work coil, the induction coil and the second work coil are made of an aluminum wire. An aluminum wire has a higher resistance to corrosion at a high temperature than a copper wire, so that the heat resistance of the work coil is improved by using an aluminum wire. As a result, cooling means for the work coil can be simplified. In addition, if the coils are wound using a single aluminum wire, the coils can keep their shape without a bobbin or other holding members since the single aluminum wire having an adequate thickness has an adequate stiffness, so that the improvement of cooling efficiency and cost reduction can be obtained. Of course, a bundle of two or more wires can be used instead of the single wire. The aluminum wire is preferably coated with an oxide film and more preferably coated with a glass so as to improve its insulation properties.

Alternatively, the first work coil and the induction coil may be made of an aluminum wire while the second work coil is made of a Litz wire that is usually used for a work coil of an induction heater.

A third configuration of the electric cooker according to the present invention is a combination of the first and second configurations, which can be used for both grill cooking and induction heating of a metal pan by changing some members. The third configuration comprises a first work coil wound in a substantially pipe-like (helical) shape for generating an alternating magnetic flux, a high frequency inverter circuit for driving the first work coil, an insulator having a substantially pipe-like shape disposed inside the first work coil, and a pair of a grill set and an IH set, one of which is exclusively selected to be attached to the electric cooker. The grill set includes a metal heating member having a substantially pipe-like shape disposed inside the insulator and coaxially with the first work coil for being heated by the alternating magnetic flux generated by the first work coil so as to generate heat rays, and means for supporting foods to be grilled, such as a wire mesh disposed adjacent to an upper opening of the insulator. The IH set includes an induction coil wound in a substantially pipe-like shape disposed inside the insulator and coaxially with the first work coil, a second work coil wound in a planar shape disposed adjacent to an upper opening of the insulator, the second work coil connected to the both ends of the induction coil, and a top plate disposed above the second work coil.

For ease of changing the grill set and the IH set, it is preferable that the induction coil, the second work coil and the top plate of the IH set are integrated, and that the metal heating member and the supporting member such as a wire mesh of the grill set are integrated. According to this preferable configuration, the IH set and the grill set can be removed or replaced as a unit easily. For example, if the top plate of the IH unit is removed, the second work coil and the induction coil are also removed together with the top plate. It is same regarding the wire mesh and the metal heating member of the grill set. For example, the metal heating member may be hung at its plural peripheral points from the periphery of the wire mesh.

DETAILED DESCRIPTION OF THE PREFERRED EMBODIMENTS

Figure 1:
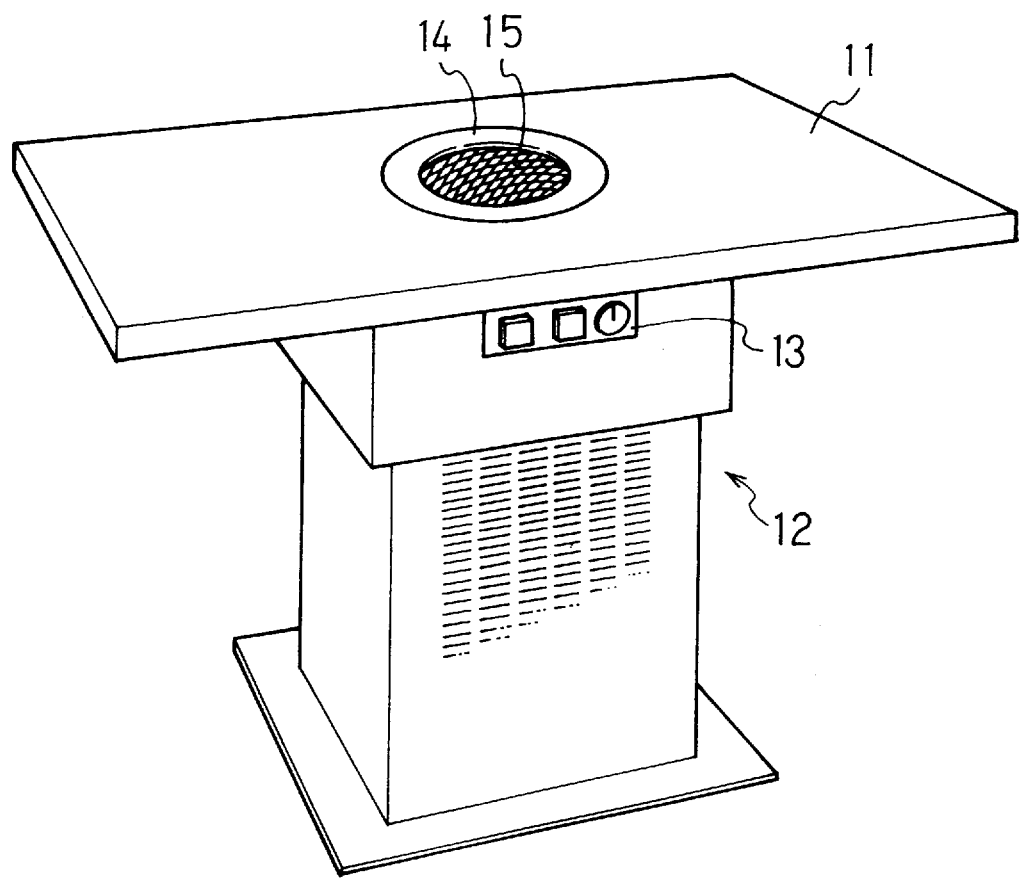
FIG. 1 is a perspective view of a cooking table using an electric cooker according to the present invention.

An example of an electric cooking table using the electric cooker according to the present invention is illustrated in FIG. 1. This electric cooking table has a table 11 and its pedestal cabinet 12. This cabinet 12 houses the electric cooker including an inverter circuit, a controller and a cooling device. A control panel 13 is disposed in front of the cabinet 12, for switching on and off the power and controlling the heat temperature. A decorative ring frame 14 and a wire mesh 15 inside the frame 14 are seen at the center of the table 11.

This cooking table shown in FIG. 1 can grill foods placed on the wire mesh 15. This cooking table also can be used for heating a metal pan or pot by induction heating by replacing some members of the electric cooker. For example, the wire mesh is replaced with a ceramic top plate, on which a metal pan is placed.

Figure 2:
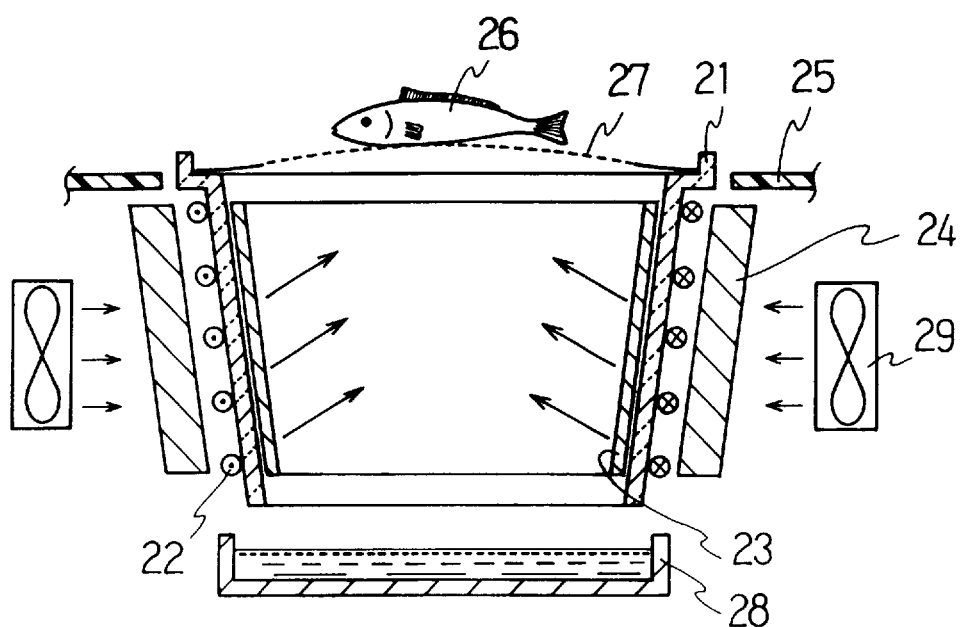
FIG. 2 is a cross section showing the inner construction of the electric cooker according to a first embodiment of the present invention.

First, several embodiments for grill cooking are explained. FIG. 2 is a cross section showing the inner structure of the electric cooker according to a first embodiment of the present invention. This electric cooker comprises a cylindrical insulator 21, a work coil 22 wound helically around the insulator 21 and a cylindrical metal heating member 23 disposed inside the insulator 21 and coaxially with the work coil 22. These three members 21, 22, 23 have cylindrical shapes, more specifically tapered cylindrical shapes such as a frustoconical surface. The insulator 21 is made of a ceramic or an alumina-silica refractory material. The metal heating member 23 is made of a stainless steel having a thickness of approximately 0.5 mm. Around the work coil 22, there is disposed a magnetic member 24, which also has a tapered cylindrical shape and is made of a high frequency electromagnetic steel.

The above mentioned electric cooker is disposed under the table 25. The upper opening space of the insulator 21 is substantially flush with the surface 25, and a wire mesh 27 is placed covering the upper opening space for supporting a heat object 26 such as meat, fish, vegetable or other foods. The upper end of the insulator wall has a step portion to support the periphery of the wire mesh 27. Instead of the wire mesh 27, skewers can be used for supporting the foods to be grilled. Under the lower opening space of the insulator 21, there is a pan or a tray 28 for receiving drops such as broth from the foods. This receiving pan 28 is detachable for cleaning and water is in the pan 28 while grilling.

The work coil 22 is driven by a conventional inverter circuit (not shown in the Figure) with a high frequency at approximately 30 kHz so as to generate an alternating magnetic flux. The alternating magnetic flux passes through the metal heating member 23, so that eddy currents are generated in the metal heating member 23. A loss due to the eddy currents heats the metal heating member 23. The tapered cylindrical magnetic member 24 disposed around the work coil 22 decreases the leakage flux to increase the efficiency of induction heating of the metal heating member 24. This magnetic member 24 also has a function of reducing an undesirable radiation (i.e., EMI). This magnetic member 24 has a tapered cylindrical shape with an air gap to prevent magnetic saturation.

The heated metal heating member 23 radiates heat rays (near, middle and far infrared rays), which grill the foods 26 placed on the wire mesh 27. Drops from the foods 26 pass through the inner space of the tapered cylindrical metal heating member 23 and enter the receiving pan 28. Since there is little possibility that the drops such as broth or fat from the foods drop onto the metal heating member 23 and cause smoke or flame, the metal heating member 23 can radiate heat rays constantly and effectively.

The surface temperature of the heating member 23 reaches approximately 800 degrees Celsius, but a rise in the temperature of the work coil 22 and the magnetic member 24 is suppressed by the insulator 21. In addition, there are means for cooling the outer space of the insulator 21. It is preferable that two or more cooling fans 29 for blowing air on the work coil 22 and the magnetic member 24 are disposed with spacing between them.

Figure 3:
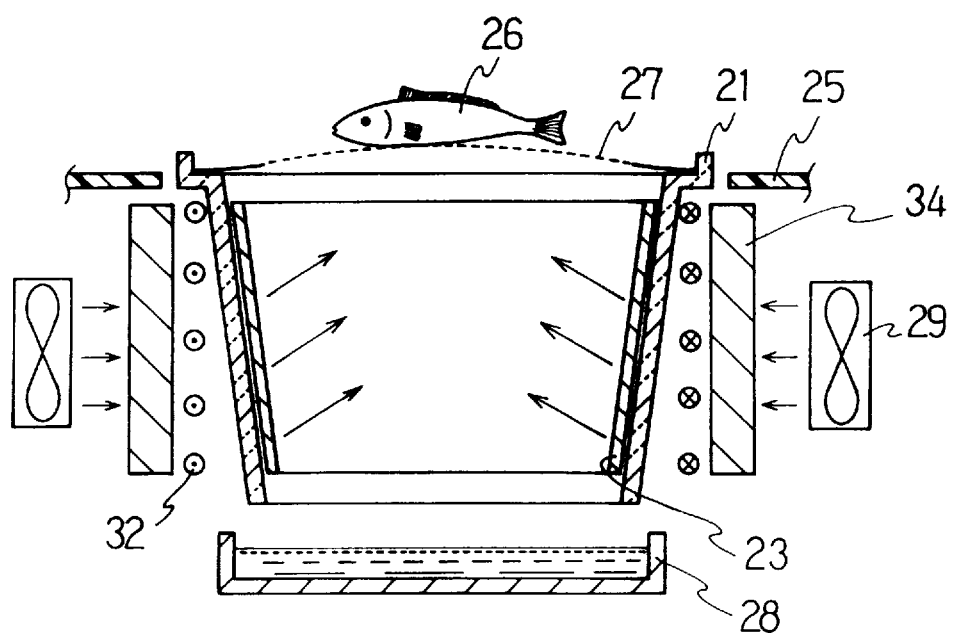
FIG. 3 is a cross section showing the inner construction of the electric cooker according to a second embodiment of the present invention.

FIG. 3 shows an electric cooker according to a second embodiment of the present invention. The shapes of the work coil 32 and the magnetic member 34 are different from those of the first embodiment shown in FIG. 2. Other members are the same as in FIG. 2. The insulator 34 of this embodiment has a cylindrical shape without taper for ease of manufacturing. The work coil 32 also has a cylindrical shape without taper.

Figure 4:
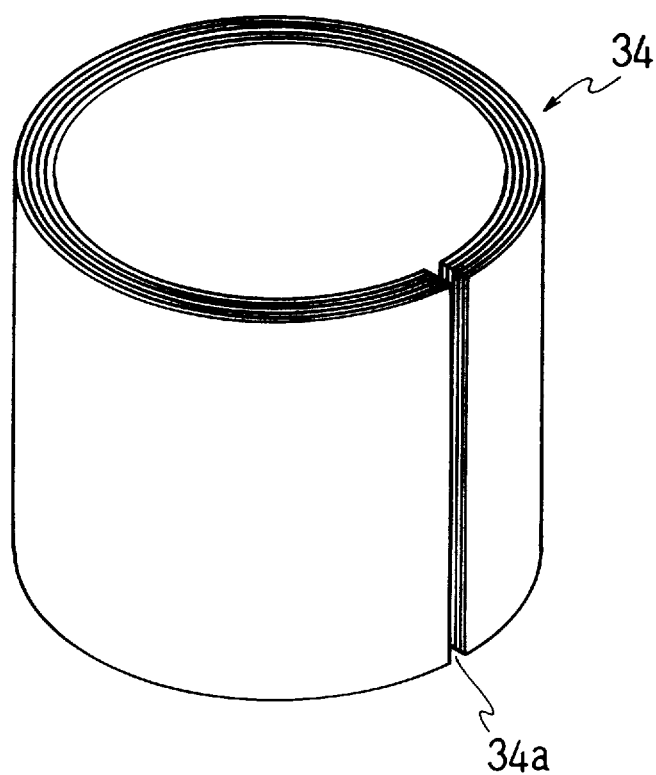
FIG. 4 is a perspective view of an example of a magnetic member that is used in the electric cooker shown in FIG. 3.

In an example, the cylindrical insulator 34 was made by laminating a high frequency electromagnetic steel as shown in FIG. 4. The cylindrical insulator 34 has an outer diameter of 280 mm and a thickness of 10 mm. Numeral 34a is an air gap to prevent a magnetic saturation, which is 1.5 mm. The work coil 32 was wound ten turns using a Litz wire (a stranded cable of insulated wires) The magnetic member 34 and the work coil 32 were integrated with an insulating paste In the above mentioned structure, the distance between the tapered cylindrical metal heating member 23 and the non-tapered cylindrical work coil 32 is larger at the lower end than at the upper end. Therefore, the efficiency of induction heating is not so high at the lower end as at the upper end of the metal heating member. However, it was found as the result of the experiment that the metal heating member 23 was heated sufficiently as a whole and there was no problem in a practical use of the above mentioned structure. Since the heating member 23 of this embodiment has the same tapered shape as that of the first embodiment, heat rays radiated from the metal heating member 23 are collected efficiently to the foods 26 placed on the wire mesh 27 disposed at the upper opening space.

Figure 5:
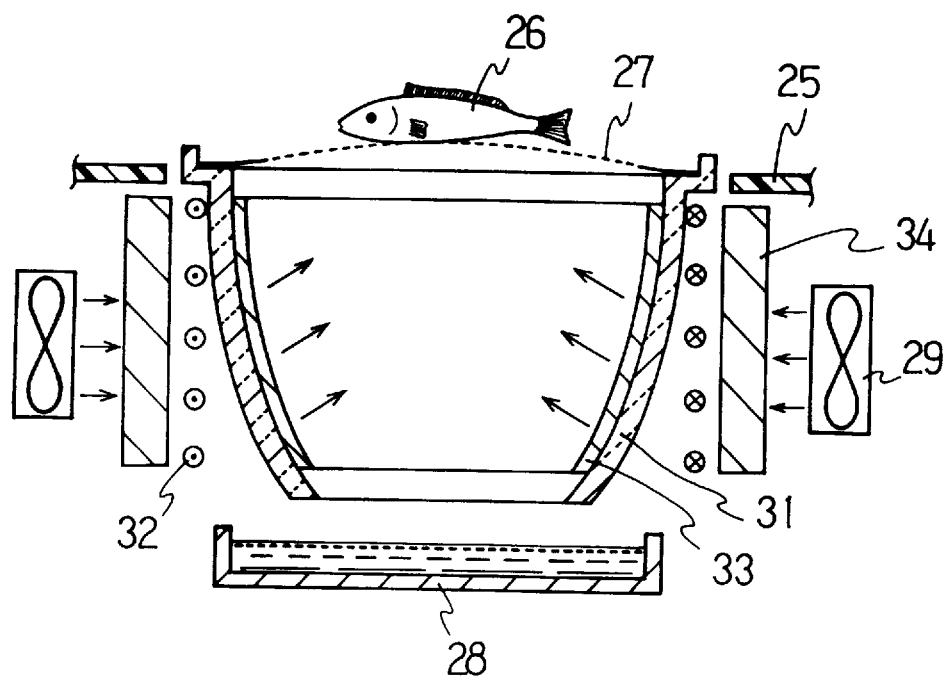
FIG. 5 is a cross section showing a variation of the electric cooker shown in FIG. 3.

FIG. 5 shows a variation of the second embodiment mentioned above. In this variation, the insulator 31 and the metal heating member 33 have a parabola-like shape, whose section has a parabola curve as shown in FIG. 5. Heat rays radiated from the parabolic metal heating member can be collected to the center portion of the upper opening space more efficiently.

In an example, an aluminum wire was used instead of the Litz wire for the work coil 32. The work coil 32 was wound using an aluminum wire with oxide film and glass coating, whose diameter is 4 mm, that is the same as the Litz wire used in the foregoing example. Conventionally, a Litz wire has been used for the work coil so that a sufficient current flows in the wire while suppressing self-heating of the wire considering the skin effect of the high frequency current. However, in this electric cooker, it was founded that there was no practical problem when using a single aluminum wire instead of the Litz wire. An aluminum wire has a higher resistance to corrosion at a high temperature than a copper wire, so that the heat resistance of the work coil is improved by using an aluminum wire. As a result, the insulating and/or cooling mechanism for the work coil can be simplified.

In addition if the work coil is wound using a single aluminum wire, the coil can keep its shape without a bobbin or other holding members since the single aluminum wire having an adequate thickness has an adequate stiffness, so that the improvement of cooling efficiency and cost reduction can be obtained. Of course, a bundle of two or more wires can be used instead of the single wire.

Figure 6:
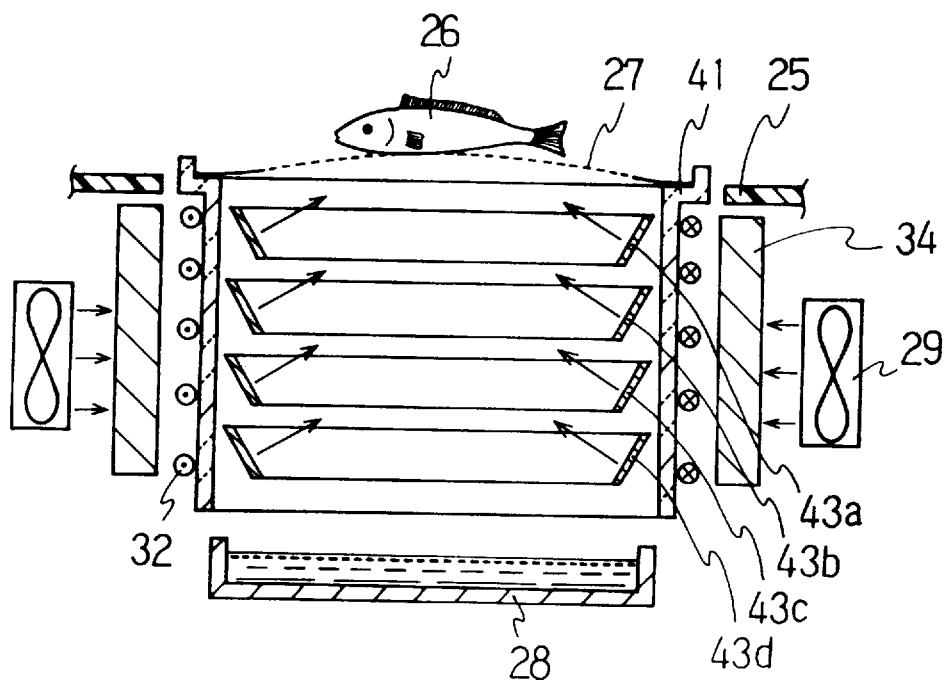
FIG. 6 is a cross section showing another variation of the electric cooker shown in FIG. 3.

Another variation is shown in FIG. 6. In this variation, not only the magnetic member 34 or the work coil 32 but also the insulator 41 has a cylindrical shape without taper. The metal heating member comprises a plurality of identical submembers 43a–43d arranged vertically and coaxially at a predetermined pitch. Each submember 43a–43d has a tapered cylindrical shape made of a metal band plate, and has a larger space area at the upper opening than at the lower opening. Therefore, heat rays radiated from each surfaces of the heated submembers 43a–43d are collected to the upper opening of the cylindrical insulator 41. It may be preferable that an upper submember has a larger diameter than a lower submember.

Figure 7:
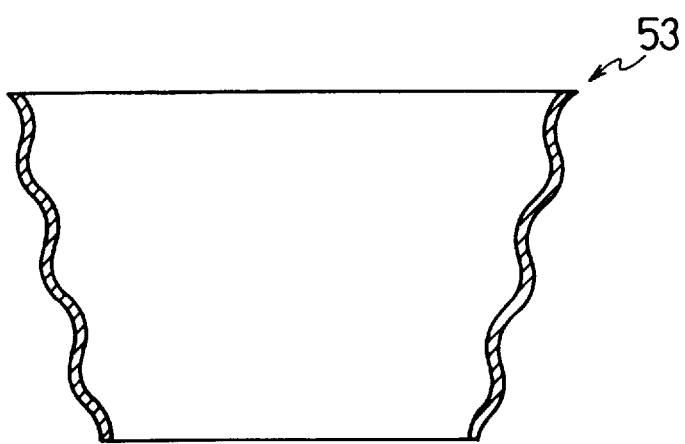
FIG. 7 is a variation of a metal heating member that is used in the electric cooker shown in FIG. 3.

FIG. 7 shows a variation of the metal heating member. The wall of this metal heating member 53 has a tapered and wavy shape. This wave-shaped wall gives the metal heating member mechanical strength, and the heat rays radiated from the upper surface of the wave-shaped metal heating member can go upward to the food placed on the wire mesh disposed at the upper opening space. The metal heating member with wave-shaped wall can have a cylindrical shape without taper.

Figure 8A:
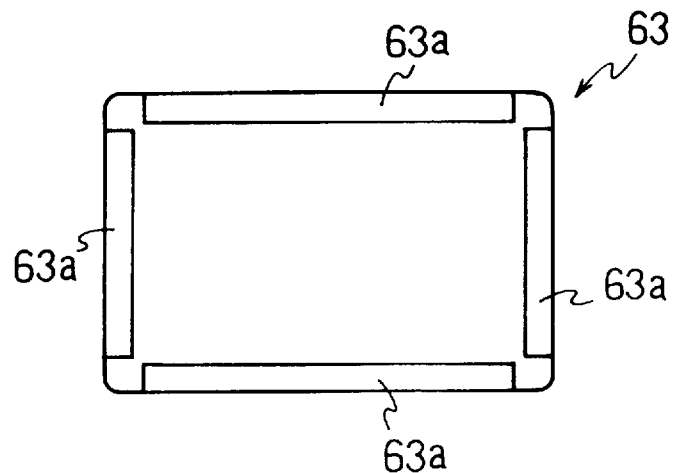
FIG. 8A is a top view of another variation of a metal heating member.
Figure 8B:
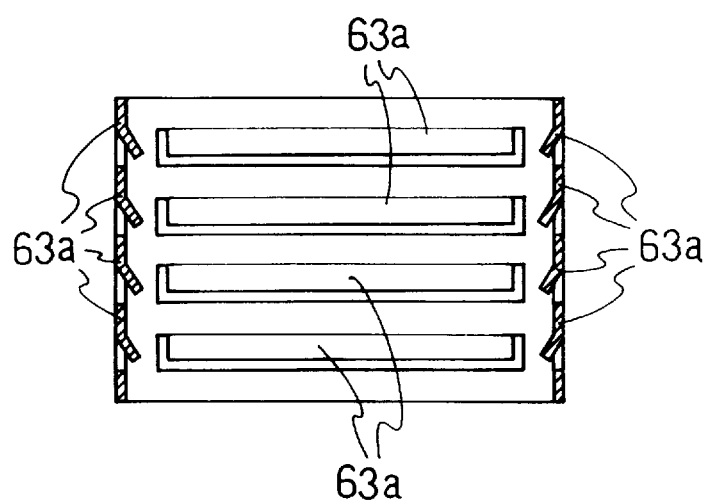
FIG. 8B is a cross section of the metal heating member shown in FIG. 8A.

FIG. 8A and 8B are a top view and a cross section showing another variation of the metal heating member. This metal heating member 63 has a rectangular pipe-like shape, and its side walls have a plurality of cut and raised portions 63a bent inward to form an upward slanting face. Heat rays radiated from the surfaces of the cut and raised portions go upward and easily reach the foods placed on the wire mesh disposed at the upper opening space. When using this metal heating member 63 that has a rectangular pipe-like shape, the insulator, the work coil and the magnetic member also should have a rectangular pipe-like shape.

The above mentioned variations are just examples. Other variations can be adopted for the shape and/or the structure of the metal heat member that has a pipe-like shape and can radiate heat rays upward for collecting the heat rays to the upper opening space.

Figure 9:
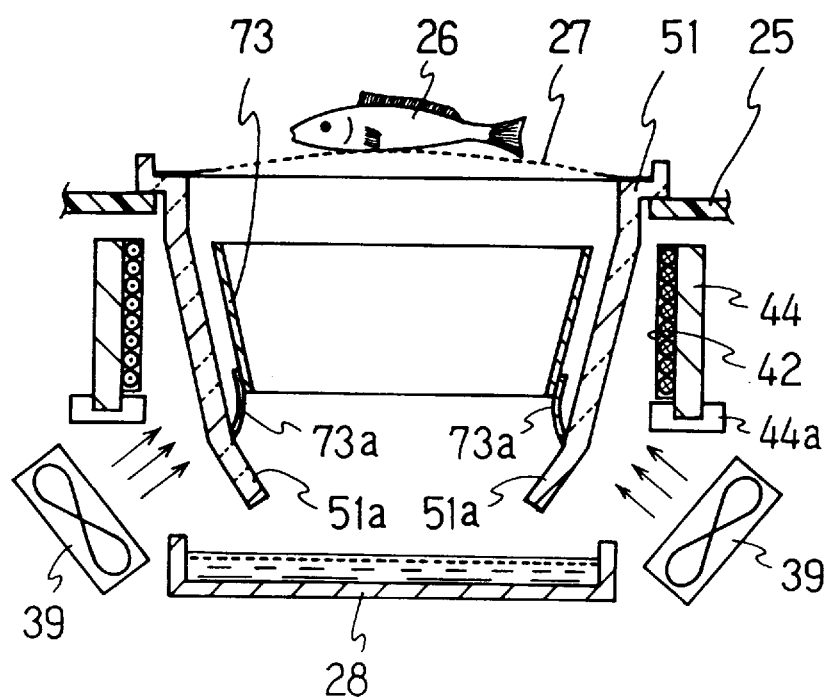
FIG. 9 is a cross section showing the inner construction of the electric cooker according to a third embodiment of the present invention.

FIG. 9 shows an electric cooker according to a third embodiment of the present invention. The metal heating member 73 of this embodiment has three or four legs 73a attached to its lower end. For example, these legs 73a are welded to the metal heating member 73. The insulator 51 has a tapered cylindrical shape and its lower end portion 51a has a larger taper angle than other portions. This lower end portion 51a of the insulator 51 abuts the tips of the legs 73a to support the metal heating member 73. This supporting structure has an advantage in that the heat resistance required of the insulator 51 can be reduced since the body of the metal heating member 73 does not contact with the insulator 51. The work coil 42 and the magnetic member 44 are integrated, and there is a supporter 44a of the magnetic member 44 in FIG. 9.

In addition, this embodiment has a plurality of cooling fans 39 disposed below the integrated work coil and magnetic member 42, 44 so as to blow air to the lower space between the insulator 51 and the work coil 42. This cooling mechanism can enhance the thermal insulation between the metal heating member 73 and the work coil 42 by an air flow between the insulator 51 and the work coil 42. However, other cooling mechanisms such as air ducts generating natural air convection can be used instead of the fans.

Figure 10:
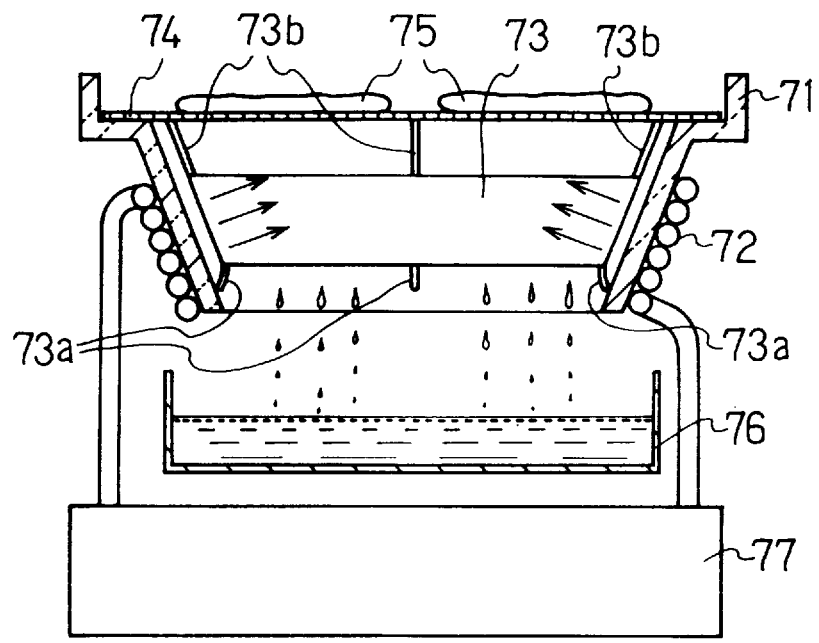
FIG. 10 is a cross section showing the inner construction of the electric cooker according to a fourth embodiment of the present invention.

FIG. 10 shows an electric cooker according to a fourth embodiment of the present invention. This embodiment comprises a tapered cylindrical insulator 71 made of a high quality insulating material such as a ceramic, a work coil 72 wound in a tapered cylindrical shape disposed around the insulator 71, and a metal heating member 73 having a tapered cylindrical shape. The insulator 71 has a lower portion whose diameter is decreasing to the lower end and an upper stepped portion for supporting the periphery of the wire mesh 74.

In an example, the work coil 72 was made of a single aluminum wire with oxide film and glass coating, whose diameter is 4 mm. An aluminum wire has a higher resistance to corrosion at a high temperature than a copper wire, so that the heat resistance of the work coil is improved by using an aluminum wire. As a result, the insulating and/or cooling mechanism for the work coil can be simplified. In addition if the work coil is wound using a single aluminum wire, the coil can keep its shape without a bobbin or other holding members since the single aluminum wire having an adequate thickness has an adequate stiffness, so that the improvement of cooling efficiency and cost reduction can be obtained. The metal heating member 73 was made of a stainless steel having a thickness of approximately 0.5 mm.

Being similar to the insulator 71, the metal heating member 73 has a tapered cylindrical shape whose diameter is smaller at the lower portion. The metal heating member 73 has four connecting portions 73b at the upper end to hang from the periphery of the wire mesh 74 for supporting foods 75. Therefore, the metal heating member 73 and the wire mesh 74 are integrated, so that the metal heating member 73 can be detached or replaced easily when detaching or replacing the wire mesh 74. This structure has another advantage in hanging the metal heating member 73 without contacting the insulator 71. The metal heating member also has four legs 73a for equal spacing between the metal heating member 73 and the insulator 71 at the lower portion.

Under the lower opening space of the insulator 71, there is a pan or a tray 76 for receiving drops such as broth from the foods 75. This receiving pan 76 can be detached for cleaning and water is in the pan 76 while grilling. It is preferable that cooling fans (not shown in the Figure)are disposed for blowing air to the work coil 72 or other members.

The work coil 72 is driven by a conventional inverter circuit (a power source) 77 with a high frequency at approximately 30 kHz so as to generate an alternating magnetic flux. The alternating magnetic flux passes through the metal heating member 73, so that eddy currents are generated in the metal heating member 73. A loss due to the eddy currents heats the metal heating member 73. The heated metal heating member 73 radiates heat rays (near, middle and far infrared rays), which heat the foods 75 placed on the wire mesh 74. Drops from the foods 75 pass through the inner space of the tapered cylindrical metal heating member 73 and enter the receiving pan 76.

Figure 11:
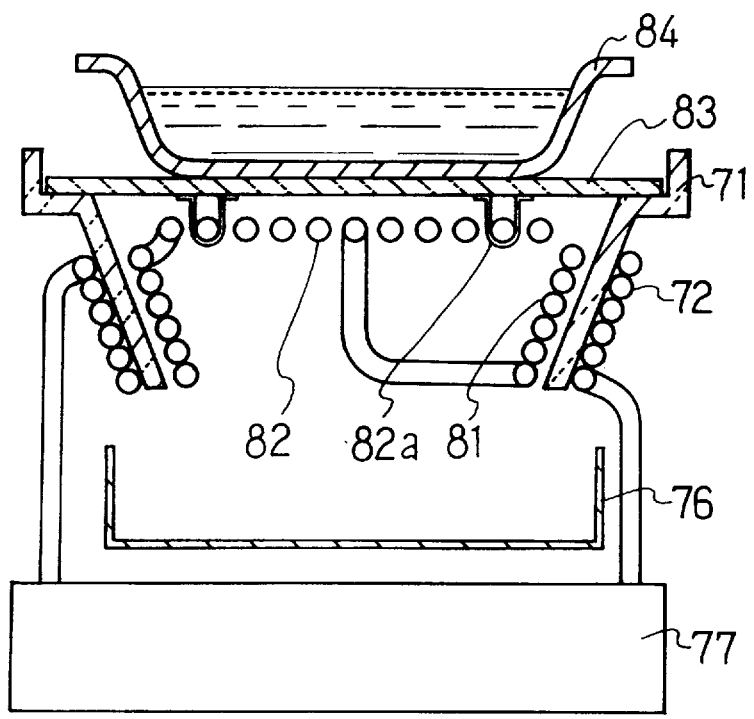
FIG. 11 is a cross section showing the inner construction of the electric cooker according to a fifth embodiment of the present invention.

FIG. 11 shows an electric cooker according to a fifth embodiment of the present invention. This embodiment has a configuration for heating a metal pan 84 placed on a top plate 83 by induction heating. The configuration of this embodiment is obtained by removing the metal heating member 73 and the wire mesh 74 in FIG. 10, and adding an induction coil 81, a second work coil 82 and the top plate 83. The induction coil 82 is disposed inside the insulator 71 and coaxially with the first work coil 72.

Figure 12:
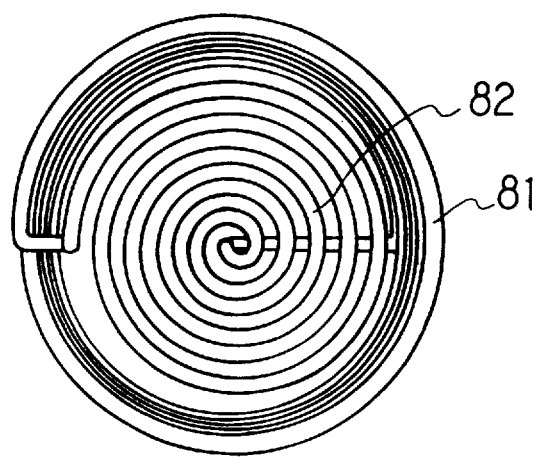
FIG. 12 is a top view of a second work coil and an induction coil of the electric cooker shown in FIG. 11.

The second work coil 82 is wound in a plan e shape, whose top view is shown in FIG. 12. The inner and outer ends of the second work coil 82 are connected to the ends of the induction coil 81. In an example shown in FIG. 11, the induction coil 81, the second work coil 82 and the connecting lines between them are wound continuously by a single aluminum wire that is the same material as the first work coil 72. The second work coil 82 is attached to the bottom surface of the top plate 83 with fittings 82a. The top plate 83, the second work coil 82 and the induction coil 81 are integrated as a unit, which is detached or replaced as an IH set. The top plate 83 is made of a ceramic that has excellent properties of heat resistance, corrosion resistance and mechanical strength.

Figure 13:
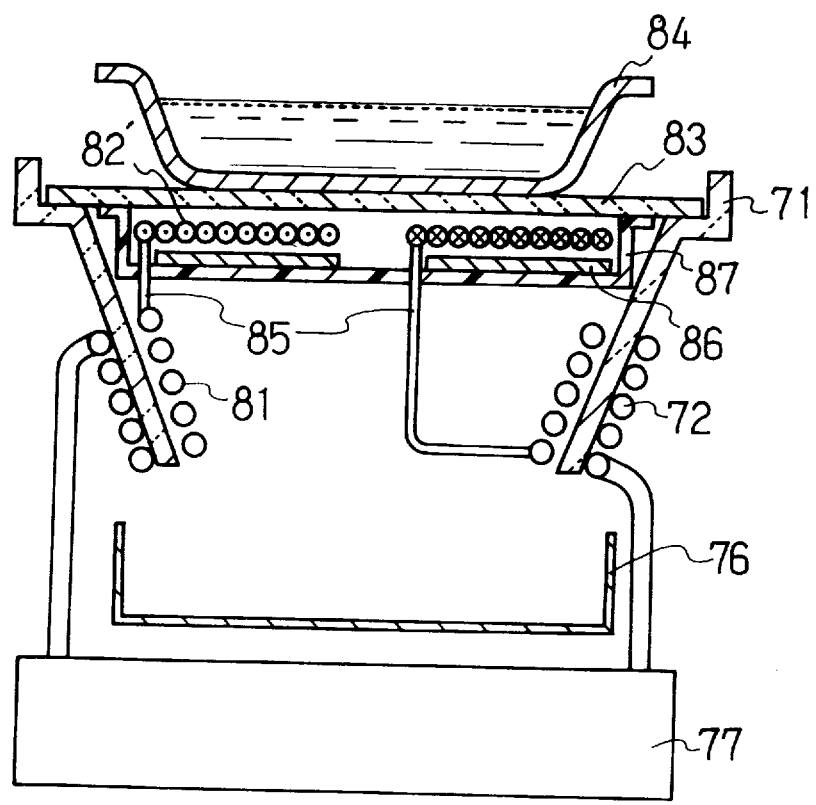
FIG. 13 is a cross section showing the inner construction of the electric cooker according to a sixth embodiment of the present invention.
Figure 14:
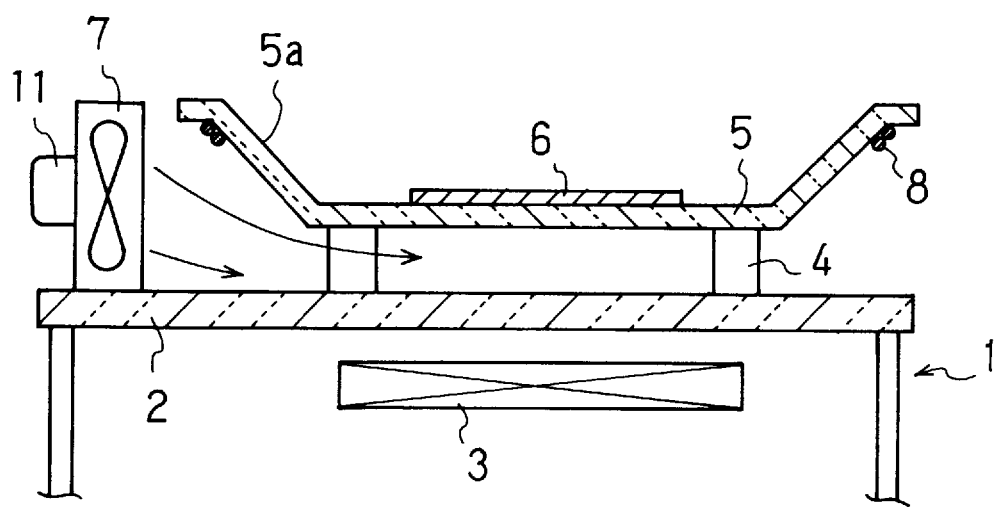
FIG. 14 is a cross section showing a schematic construction of the electric cooker that can grill foods using induction heating in the prior art.

FIG. 13 shows an electric cooker according to a sixth embodiment of the present invention. In this embodiment, the induction coil 81 is made of the same single aluminum wire as the first work coil 72, while the second work coil 82' is made of a Litz wire suitable for high frequency driving, and the both coils 81, 82' are connected with a suitable wire 85. A magnetic plate 86 is disposed under the second work coil 82'. The second work coil 82' and the magnetic plate 86 are fixed to the bottom face of the top plate 83 using a fixing frame 87 made of a heat-resistant reinforced plastic. The magnetic plate enhances the efficiency of induction heating by reducing a leakage flux. It is preferable to dispose a plurality of magnetic plates having a fan shape, at a predetermined angular pitch.

In the above mentioned fourth or fifth embodiment, a conventional inverter circuit 77 drives the first work coil 72 with a high frequency at approximately 30 kHz. Then, an alternating current is generated in the induction coil 81, which is disposed inside the insulator 71 and coaxially with the first work coil 72. In other words, the high frequency power is transmitted from the first work coil 72, that is a primary coil, to the induction coil 81, that is a secondary coil of a transformer. Thus, the high frequency power is supplied to the second work coil 82 or 82' that is connected to the induction coil 81. The second work coil 82 or 82' generates an alternating magnetic flux, which generates eddy currents in the bottom portion of the metal pan 84. As a result, the metal pan 84 is heated by an eddy current loss.

As explained above, the electric cooker according to the present invention comprises a substantially pipe-like insulator, a work coil disposed around the insulator, and a metal heating member having a substantially pipe-like shape disposed inside the insulator. Therefore, drops from foods placed at the upper opening space pass through the inner space of the metal heating member to enter directly into the receiving pan without contacting the metal heating member, to reduce the problems such as smoke and flame or a drop in efficiency of the heat radiation that otherwise may occur. As a result, the electric cooker according to the present invention can realize a simple ventilation of the cooking room, a power saving, and a clean cooking atmosphere.

In addition, the electric cooker according to the present invention can switch grill cooking of foods and induction heating of a metal pan by exchanging some members, preferably a unit of members.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

We claim:
1. An electric cooker using induction heating, comprising:
a work coil wound in a substantially pipe-like shape for generating an alternating magnetic flux;
a metal heating member having a substantially pipe-like shape disposed inside and coaxially with the work coil for being heated by the alternating magnetic flux generated by the work coil so as to generate heat rays;
an insulator having a substantially pipe-like shape disposed between the work coil and the metal heating member; and
a support for foods to be grilled, disposed adjacent to an upper opening of the insulator.

2. The electric cooker according to claim 1, further comprising a pan for receiving drops from the foods, disposed adjacent to a lower opening of the insulator.

3. The electric cooker according to claim 1, further comprising a magnetic member having a substantially pipe-like shape, disposed around the work coil.

4. The electric cooker according to claim 1, further comprising means for cooling an outer space of the insulator.

5. The electric cooker according to claim 1, wherein the metal heating member is made of a stainless steel plate having a thickness of 0.2–2.0 mm.

6. The electric cooker according to claim 1, wherein the metal heating member has a shape suitable for collecting heating rays from the metal heating member to the upper opening.

7. The electric cooker according to claim 6, wherein the metal heating member has a tapered pipe-like shape that has a larger space area at the upper opening than at the lower opening.

8. The electric cooker according to claim 6, wherein the metal heating member comprises a plurality of short pipe-like submembers arranged vertically and coaxially at a predetermined pitch, each of which has a larger space area at the upper opening than at the lower opening.

9. The electric cooker according to claim 1, further comprising a high frequency inverter for driving the work coil.

10. The electric cooker according to claim 1, wherein the work coil is wound using an aluminum wire.

11. The electric cooker according to claim 1, wherein the work coil is wound using an aluminum wire with an oxide film.

12. The electric cooker according to claim 1, wherein the work coil is wound using an aluminum wire with an oxide film and glass coating.

13. An electric cooker using induction heating, comprising:
a first work coil wound in a substantially pipe-like shape for generating an alternating magnetic flux;
an induction coil wound in a substantially pipe-like shape disposed inside and coaxially with the first work coil;
an insulator having a substantially pipe-like shape disposed between the first work coil and the induction coil;
a second work coil wound in a plane shape disposed adjacent to an upper opening of the insulator, the second work coil connected to the both ends of the induction coil; and a top plate disposed above the second work coil, suitable for supporting a container holding food to be heated.

14. The electric cooker according to claim 13, further comprising a magnetic member having a substantially pipe-like shape disposed around the first work coil.

15. The electric cooker according to claim 13, further comprising a high frequency inverter circuit for driving the first work coil.

16. The electric cooker according to claim 13, wherein the first work coil, the induction coil and the second work coil are wound using an aluminum wire.

17. The electric cooker according to claim 13, wherein the first work coil, the induction coil and the second work coil are wound using an aluminum wire with an oxide film.

18. The electric cooker according to claim 13, wherein the first work coil, the induction coil and the second work coil are wound using an aluminum wire with an oxide film and glass coating.

19. The electric cooker according to claim 13, wherein the first work coil and the induction coil are wound using an aluminum wire, and the second work coil is wound using a Litz wire.

20. An electric cooker using induction heating, comprising:
   a first work coil wound in a substantially pipe-like shape for generating an alternating magnetic flux;
   a high frequency inverter circuit for driving the first work coil;
   an insulator having a substantially pipe-like shape disposed inside the first work coil;
   a pair of a grill set and an IH set, only one of which is to be used at one time;
   the grill set including
      a metal heating member having a substantially pipe-like shape disposed inside the insulator and coaxially with the first work coil for being heated by the alternating magnetic flux generated by the first work coil so as to generate heat rays, and
      a support for foods to be grilled, in use disposed adjacently to an upper opening of the insulator; and
   the IH set including
      an induction coil wound in a substantially pipe-like shape disposed inside the insulator and coaxially with the first work coil;
      a second work coil wound in a plane shape, in use disposed adjacently to an upper opening of the insulator, the second work coil connected to the both ends of the induction coil; and
      a top plate disposed above the second work coil, in use suitable for supporting a container for food to be heated.

21. The electric cooker according to claim 20, wherein the induction coil and the second work coil are integrated as a unit.

22. The electric cooker according to claim 20, wherein the metal heating member and the supporting means are integrated as a unit.

* * * * *